Jan. 5, 1965  H. W. STRAUB  3,164,725
OPTICAL RANGE FINDER
Filed March 29, 1961

INVENTOR,
HARALD W. STRAUB

BY S.J. Rotondi, A.J. Dupont,
A.E. McGee & M.T. Platt

3,164,725
OPTICAL RANGE FINDER
Harald W. Straub, Bethesda, Md., assignor to the United States of America as represented by the Secretary of the Army
Filed Mar. 29, 1961, Ser. No. 99,321
1 Claim. (Cl. 250—216)
(Granted under Title 35, U.S. Code (1952), sec. 266)

The invention described herein may be manufactured and used by or for the Government for governmental purposes without the payment to me of any royalty thereon.

This invention relates generally to range finders and more particularly to an optical range finder which combines the advantages of the prior art optical and radar range finders in a compact and easily operated device.

The well known radar range finder of the pulse type has the advantages of great precision and speed of measurement, but has poor resolution and the operator is usually unaware of the nature of the target to which he is determining the distance. On the other hand, prior art optical range finders of the triangulation type allow the operator to see which target he is ranging and provide a high degree of resolution. However, these range finders are only accurate out to a distance commensurate with the length of the base line and their operation is rather cumbersome and time consuming.

The instant invention combines the best features of both of the above described prior art range finders in an optical system wherein modulated light is directed onto a target sighted by the operator and the phase of the reflected light is compared with that of the radiated light to provide an indication of range to the target.

It is therefore an object of this invention to provide a new and improved range finder.

A further object is to provide an optical range finder which is precise, has good resolution, allows the operator to know which target he is ranging, and makes rapid measurements.

Another object of this invention is to provide an optical range finder which obtains the range measurement by a comparison of phase between transmitted and returned light signals.

It is also an object of this invention to provide a range finder which has the advantage of security from enemy detection.

Other objects, advantages and features of the invention will become apparent from a consideration of the following description taken in conjunction with the drawings in which.

Figure 1:
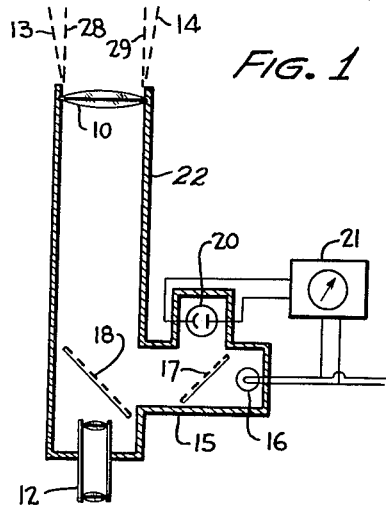
FIG. 1 is a diagrammatic representation of one embodiment of the invention.

Referring now to FIG. 1, there is shown a telescope 22 having eyepiece 12 and objective lens 10. In side tube 15 there is disposed a source of modulated light 16, preferably in the ultraviolet or infra-red ranges, which passes through half-silvered mirror 17 and is reflected toward objective lens 10 by half-silvered mirror 18. Phototube 20 is positioned so as to pick up light reflected from the reflecting side of half-silvered mirror 17. The output of phototube 20 is connected to one input of phase comparator 21 whose other input is connected to modulated light source 16.

An essential requirement for proper operation of the range finder is that the radiated light pattern and detection pattern be quasi-parallel, that is confined within a relatively narrow volume having parallel boundaries. This enables the operator of the range finder to direct the radiated light on a small selected area and prevents spurious reflections from affecting the detection operation. The above-described radiation and detection patterns are obtained by applying the principles set forth in my copending application entitled "Optical Devices for Producing Parallel Beams," Serial No. 821,615, filed on June 19, 1959, now Patent No. 3,001,079. Briefly, in order to confine the radiation and detection patterns within the limits defined by parallel lines 28 and 29, the following procedure must be followed: (1) select a distance D from lens 10 for which a pattern of uniform width is desired, (2) determine from the equation $$\frac{1}{d}+\frac{1}{D}=\frac{1}{f}$$

at what distance $d$ from the lens 10, whose focal length is $f$, an image would be formed of an object at the distance D, (3) determine the diameter I of the image formed, if the object had a diameter L equal to that of the exit pupil of the lens from the equation $$\frac{D}{d}=\frac{I}{L}$$

(4) select a light source 16 and a cathode for tube 20 with diameters equal to I and position them at a distance $d$ from the lens 10.

In operation, the user of the range finder sights a target in the field of view of the telescope, indicated generally by lines 13 and 14. The light beam, whose location in the field of view may be indicated by a circle of the same diameter as light source 16 on eyepiece 12, is then directed onto the target. Light reflected from the targe is picked up by the detection pattern and reflected by half-silvered mirrors 18 and 17 onto phototube 20. The phase of the phototube's output is compared in phase-comparator 21 with the phase of the driving voltage applied to light source 16. A measure of the range to the target is obtained from the phasemeter's output.

Preferably, the light is pulse modulated. This can be readily accomplished, for example, through the use of the well known Kerr cell, which rotates the plane of polarization of light in proportion to the voltage applied to the cell. A source of light which is polarized by a polarizing filter would then be applied to the input of a Kerr cell and a source of voltage pulses having a predetermined amplitude would be applied to the cell's electrodes. The plane of polarization of the applied light would therefore be rotated a predetermined amount in response to each of the voltage pulses. The proper polarizing filter connected to the output of the Kerr cell would then pass only the light which has been rotated. A source of pulsed light having the same repetition rate as the voltage pulse train would therefore result.

Figure 2:
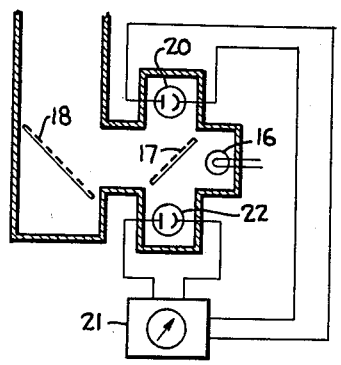
FIG. 2 is an alternative arrangement of the phase comparing portion of the range finder.

If it is determined that the modulated light is slightly out of phase with its driving voltage, the arrangement shown in FIG. 2 may be employed to overcome this deficiency. Additional photocell 22 is positioned in the path of a portion of the light emitted by source 16 and reflected by the rear of half-silvered mirror 17. A phase comparison is then made in phasemeter 21 of the outputs of photocells 20 and 22.

Figure 3:
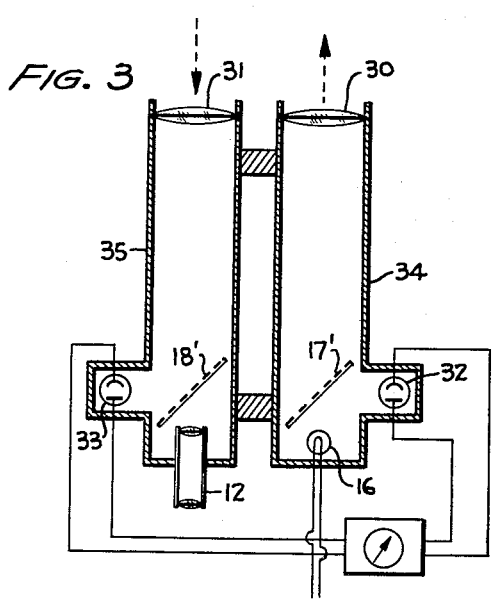
FIG. 3 is another possible physical arrangement of the range finder depicted in FIG. 1.

The arrangement shown in FIG. 3 is utilized in applications where greater precision is required and light reflected from source 16 onto phototube 20 in FIG. 1 cannot be tolerated. Tube 35 contains eyepiece 12, lens 31, half-silvered mirror 18' and phototube 33, while tube 34 contains light source 16, lens 30, half-silvered mirror 17' and phototube 32. The parts are disposed in the same relationship as that described in connection with FIGS. 1 and 2, except that separate tubes 34 and 35 are employed as shown. The tubes are ganged together for conjoint movement so that when the operator sights a target through tube 35, light will be directed onto the target from tube 34.

Figure 4:
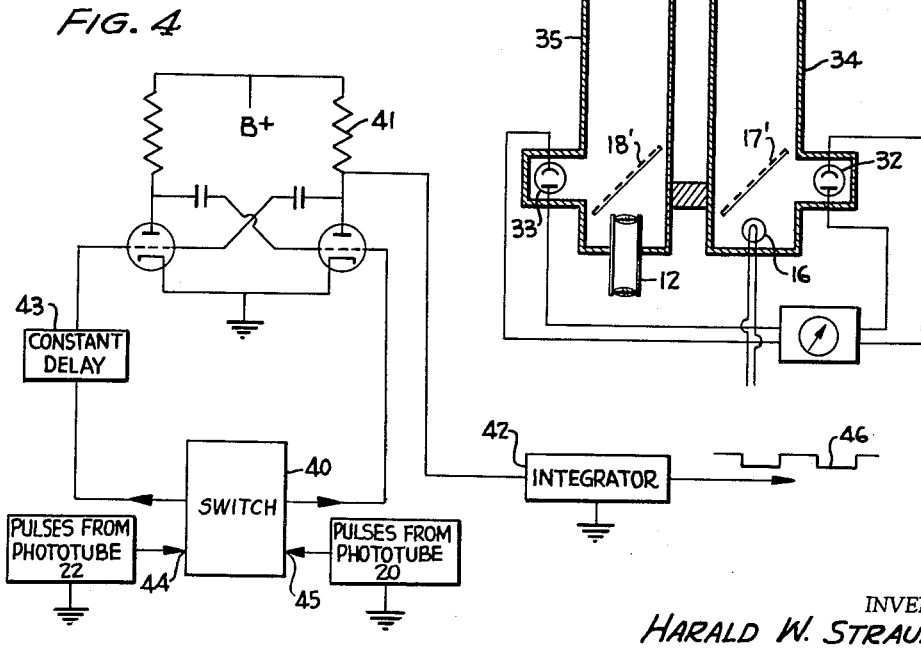
FIG. 4 is a circuit diagram of the phase shifter utilized in the optical range finder.

The circuit shown in FIG. 4 is one example of a phasemeter which may be utilized in conjunction with the instant invention. Pulses from phototube 22 are applied to terminal 44 of switch 40 while those from phototube 20 are applied to terminal 45. The two sets of pulses are alternately switched, at about 1/60 of the pulse repetition rate, into the input side of multivibrator 41 having constant time delay 43 in its path. The output of multivibrator 41 is applied to integrator 42. The resulting square wave 46 has a peak-to-peak amplitude which is proportional to the phase difference between the two pulse trains and a frequency of 1/60 the pulse repetition rate. See "Electronic Switching in Phase Measurement" by Frank Vrataric, Jr., on pages 60 and 61 of Electronics, June 5, 1959, for a more detailed discussion of the phasemeter.

The square wave 46 may be applied, as described in the Electronics article, to a meter calibrated in range. Square wave 46 may also be utilized to directly control the elevation of a tank gun, for example, and consequently its firing range. In such an application the azimuth drive of the gun would be servoed to the azimuth motion of the telescope.

It should be realized that the embodiments shown are only exemplary and that various modifications are possible. For example, wherever a lens is shown, it should be understood that any suitable optical system could be equally well employed.

I claim as my invention:

An improved and highly sensitive optical rangefinder designed for optimum performance with targets at distances not in excess of a fixed predetermined distance D, comprising:

(a) optical receiving means having quasi-parallel beam sensitivity characteristics out to said distance D, said receiving means comprising;
   (1) a lens of diameter L and focal length $f$;
   (2) a phototube having an effective sensitive diameter I;
   (3) means for causing light from a target on the axis of said lens to impinge on the center of the sensitive area of said phototube;
   (4) said phototube being at an optical distance $d$ from said lens, as determined by the relation $$\frac{1}{d}+\frac{1}{D}=\frac{1}{f}$$

(5) the ratio of I to L being determined by the relation $$\frac{I}{L}=\frac{D}{d}$$

(b) aiming means for aligning said receiving means with a desired target so that the target lies on the axis of said lens;

(c) optical projection means for illuminating said target with a beam of modulated light that is quasi-parallel out to said distance D, the quasi-parallel projection pattern of said projection means being substantially coincident with the quasi-parallel sensitivity pattern of said receiving means, said projection means comprising:
   (1) said lens;
   (2) a light source having the same effective diameter I as said photo tube;
   (3) means holding said light source in optical alignment with the axis of said lens;
   (4) said light source located at the same optical distance $d$ as said phototube from said lens; and (d) means responsive to the output of said phototube for comparing the phase of the received light with the phase of the projected light, thereby furnishing an indication of target distance.

References Cited by the Examiner

UNITED STATES PATENTS

| | | | |
|---|---|---|---|
| 2,884,830 | 5/59 | Hildebrand | 88—1 |
| 2,930,278 | 3/60 | Hansen | 88—1 |
| 2,966,090 | 12/60 | Scholdstrom | 88—1 |
| 2,970,310 | 1/61 | Bruce | 340—366 |
| 2,982,167 | 5/61 | Friden et al. | 88—1 |
| 3,010,019 | 11/61 | Sohst | 250—83.3 |
| 3,022,702 | 2/62 | Pocher | 88—1 |
| 3,037,418 | 6/62 | Hildebrand | 88—1 |

RALPH G. NILSON, *Primary Examiner.*

MAYNARD R. WILBUR, CHESTER L. JUSTUS,
                                      *Examiners.*